United States Patent [19]

Frye

[11] 4,183,349

[45] Jan. 15, 1980

[54] THERMAL INDUCTION UNIT

[76] Inventor: John S. Frye, 3098 Trafalgar Way, Chamblee, Ga. 30341

[21] Appl. No.: 854,727

[22] Filed: Nov. 25, 1977

[51] Int. Cl.² .......................... F24J 3/02; F28F 27/00
[52] U.S. Cl. ...................................... 126/439; 165/96
[58] Field of Search ................... 126/270, 271; 165/96

[56] References Cited

U.S. PATENT DOCUMENTS

| | | | |
|---|---|---|---|
| 2,888,007 | 5/1959 | Tabor | 126/271 |
| 3,936,157 | 2/1976 | Kapany | 126/270 |
| 4,002,159 | 1/1977 | Angilletta | 126/270 |
| 4,007,729 | 2/1977 | Chao et al. | 126/271 |
| 4,067,319 | 1/1978 | Wassermann | 126/271 |

*Primary Examiner*—Charles J. Myhre
*Assistant Examiner*—M. Moy
*Attorney, Agent, or Firm*—Jones, Thomas & Askew

[57] ABSTRACT

The thermal induction unit utilizes heat rays radiated by external material bodies by virtue of their absolute temperature and by reflection. The majority of the surface area of the thermal induction unit is fabricated of heat insulation material so as to inhibit heat transfer therethrough and passages are provided throughout the otherwise insulated area. The structure on the induction side of the unit is so conformed as to reflect, direct and converge radiant heat rays through the passages and thus into the environment on the opposite side of the induction unit.

9 Claims, 10 Drawing Figures

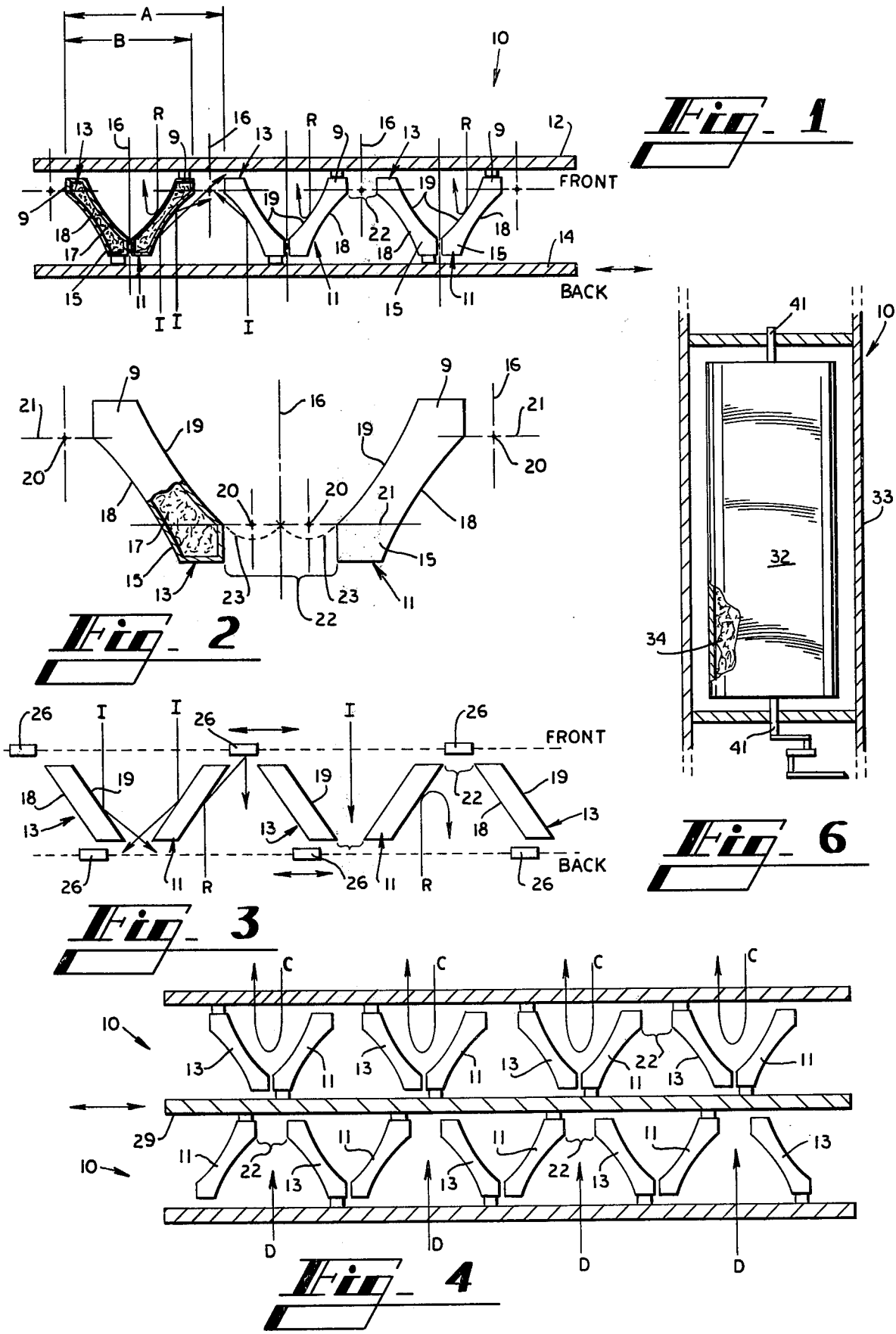

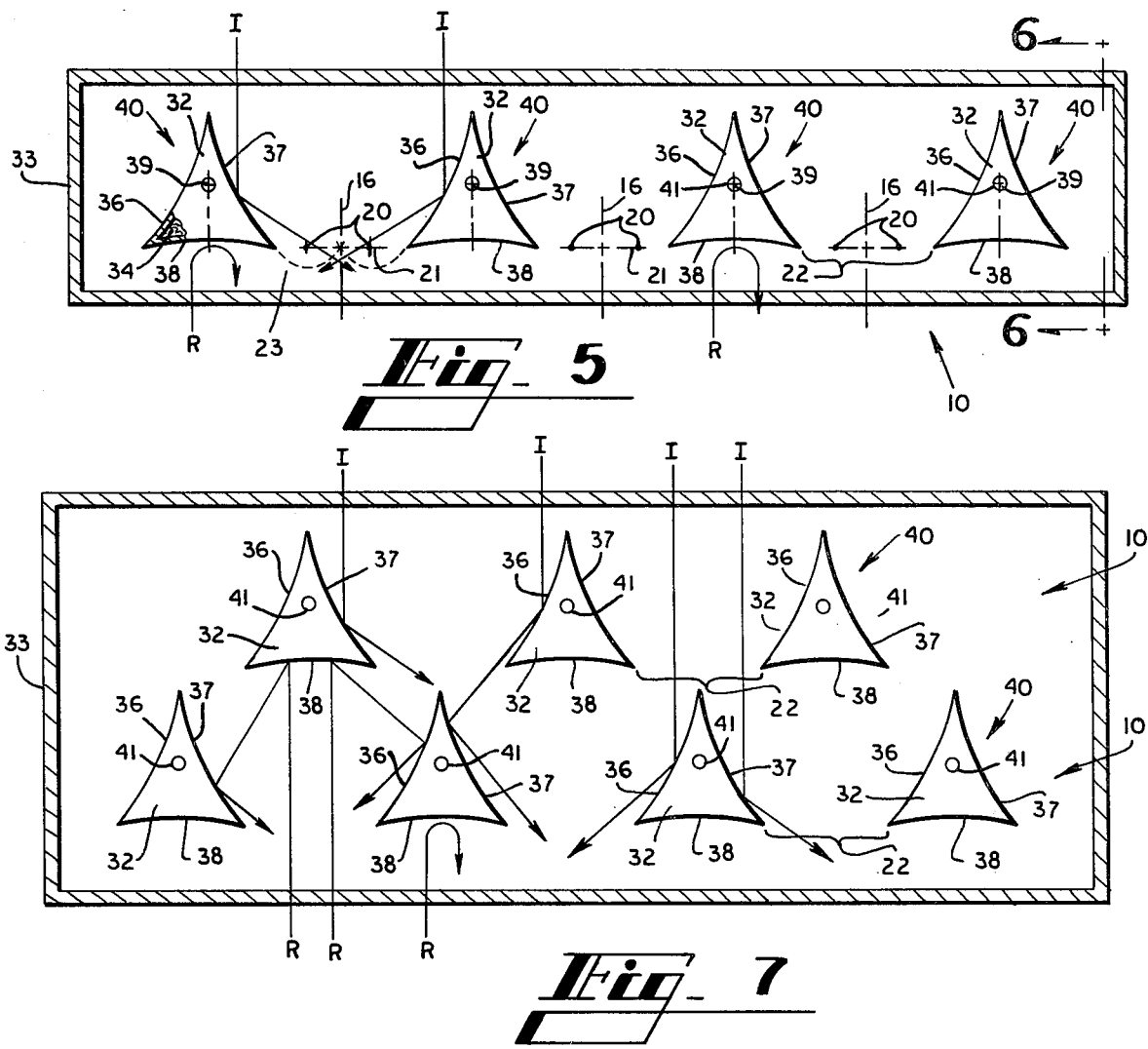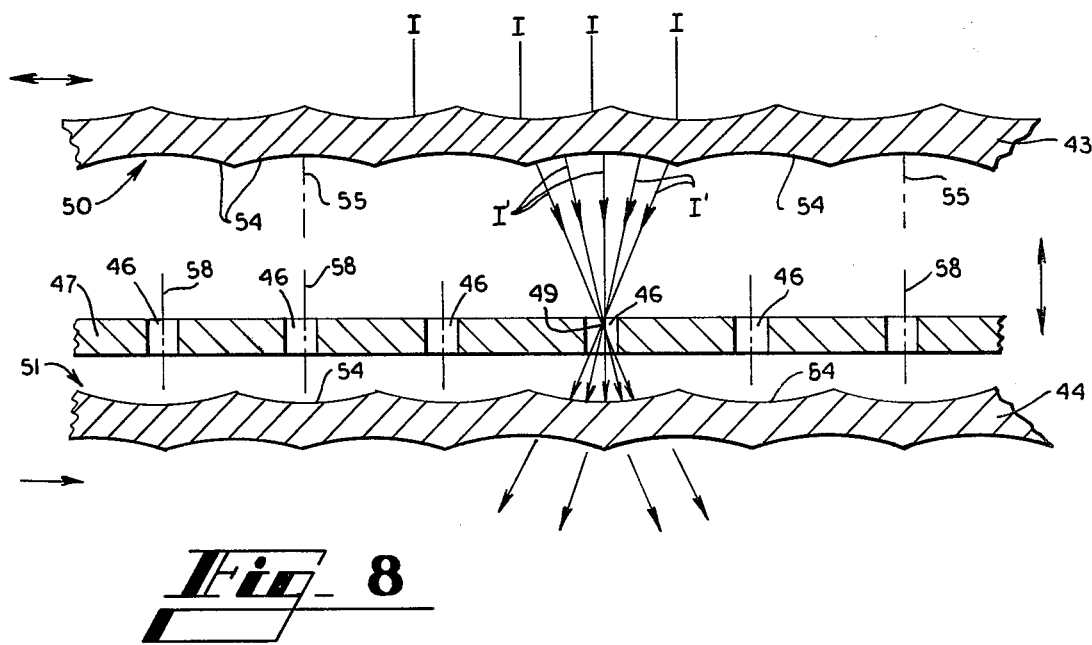

4,183,349

THERMAL INDUCTION UNIT

BACKGROUND OF THE INVENTION

There exist in technology today numerous types of energy collection conversion systems which heat and cool homes and other buildings. Each of these existing systems has disadvantages which make it somewhat undesirable in light of the present energy demand and fuel shortage.

For example, the most prominent of systems are fuel combustion systems. These systems have disadvantages in that they require fuel which is expensive and in uncertain supply. Fuel combustion systems require fuel for combustion and also an additional amount of energy to circulate the heat transfer medium. Also, the waste products of combustion must be disposed of resulting in undesired air pollution and loss of produced energy. Moreover, the heating and cooling modes of a typical modern system usually require two separate heat exchange systems to operate with one air circulation system.

Solar heat systems can collect heat feasibly only during daylight hours of high radiation days and storage facilities are needed to retain contained heat between periods of collection and use/demand. Additional heat circulation apparatus is required to circulate the heat stored from the solar heat collector throughout the areas to be heated.

Heat pump systems have similar disadvantages in that additional energy input is required for both the heat collection function and for circulation of the heat transfer medium. If the external atmosphere is used as a heat source, efficiency decreases as the external temperature decreases, so that supplemental heat from fuel or electrical systems may be required. The thermal cycling of the heat transfer medium requires additional equipment which must be purchased and maintained.

Environmental kinetic energy systems such as windmills, water power, etc. are not always practical as an energy source and the storage of energy accumulated is both difficult and expensive. Machinery for subsequently making use of the energy is required and requires maintenance and replacement.

SUMMARY OF THE INVENTION

Briefly described, the invention disclosed herein comprises a thermal induction unit which utilizes the heat rays given off by adjacent external material bodies by virtue of their absolute temperature as well as by reflection from other sources. The thermal induction unit comprises a heat transfer barrier fabricated of heat insulation materials and a plurality of openings are formed in the barrier. On one side of the heat transfer barrier the structure is shaped so as to focus heat emitted from other external objects through the openings in the barrier, while on the opposite side of the barrier the structure is shaped so as to focus heat away from the openings in the barrier.

The thermal induction unit acts as an insulator over the majority of its surface area so as to inhibit heat transfer. However, its surfaces are shaped so as to reflect, direct and converge radiant heat rays through its passages and thus into the environment on the opposite side. The opposite approach to the passages is not provided with converging or reflecting conformation, therefore the intensity of radiation passing in reverse, from the opposite side to the induction side, can be expected to be no more than that normal to the environment due to its absolute temperature.

There is no fuel combustion required and the system operates continually, direct solar radiation or visible radiation is not required. The unit has the additional advantage that no machinery is required and no heat transfer medium is required, however circulation of air in the heated or cooled environment provides an additional advantage of distributing the heated or cooled environment formed adjacent the unit.

The thermal induction unit is compatible with other systems, such as those previously mentioned, both in its original installation or as later installed. The unit is compatible with most thermal insulation and can be, in itself, an insulating system.

Changing from a heating mode to cooling mode requires only a simple reversal of parts in the mechanism and, other than this heat/cool changeover, no moving parts or mechanisms are required.

It is therefore an object of this invention to provide a mechanically simple system for heating or cooling an environment.

Another object of this invention is to provide a heating and cooling system which operates continually and does not require the combustion of fuel to create energy.

Still another object of this invention is to heat and cool an environment continually without the need for collecting and storage of energy.

Other objects, features and advantages of the present invention will become apparent upon reading the following specification, when taken in conjunction with the accompanying drawings.

BRIEF DESCRIPTION OF THE DRAWINGS

FIG. 1 is a top cross section of the thermal induction unit in accordance with the present invention, with one pair of the vanes being shown in cross section.

FIG. 2 is an isolated view of the vanes used by the thermal induction unit of FIG. 1, with one of the vanes being shown partially in cross section.

FIG. 3 is a top schematic of a thermal induction unit as in FIG. 1, but illustrating a different embodiment thereof.

FIG. 4 is a top schematic of a thermal induction unit, showing the combination of two thermal induction units as in FIG. 1.

FIG. 5 is a top cross section of an alternative embodiment of a thermal induction unit according to the present invention with the vanes illustrated further apart from one another than they would be in a functional embodiment of the invention.

FIG. 6 is a vertical end section view of the thermal induction unit of FIG. 5, taken along lines 6—6 of FIG. 5.

FIG. 7 is a top cross section of a thermal induction unit showing the combination of two thermal induction units as in FIG. 5, with the vanes illustrated further apart from one another than they would be in a functional embodiment of the invention.

FIG. 8 is a top cross section of a second alternative embodiment of a thermal induction unit according to the invention.

DETAILED DESCRIPTION

Figure 9:
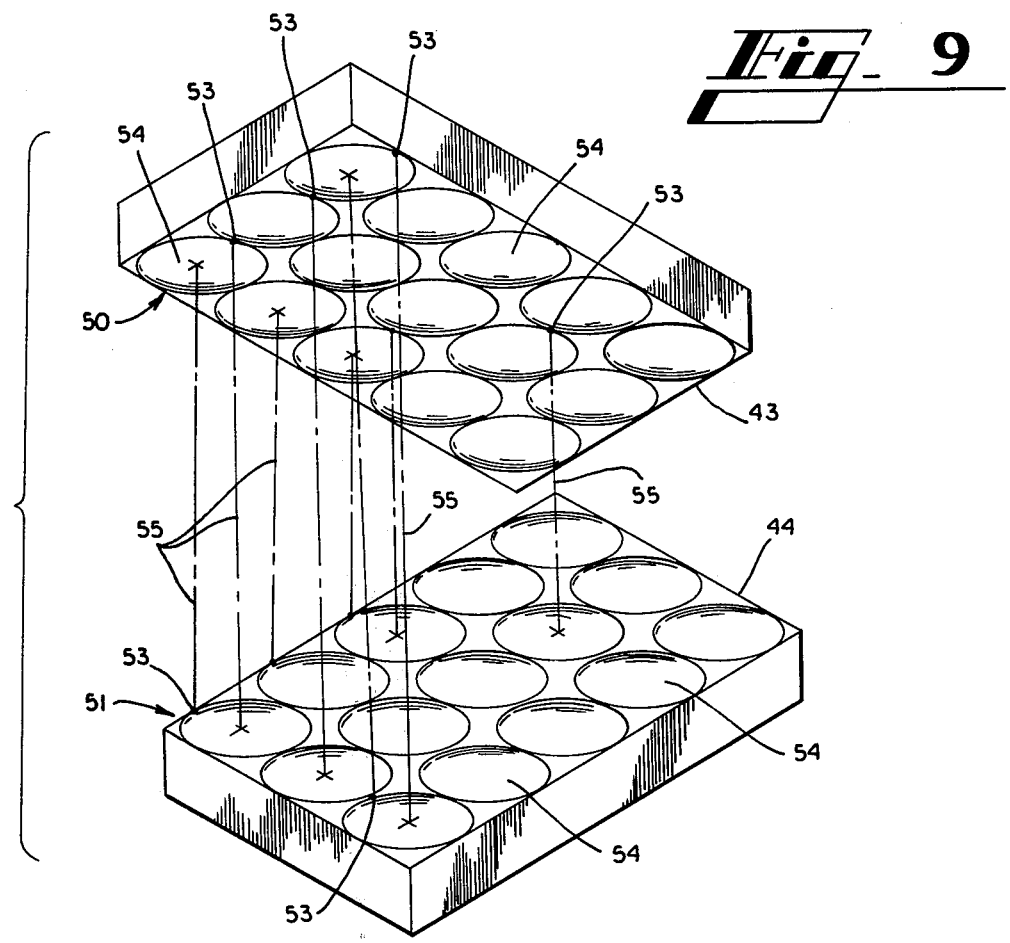
FIG. 9 is an exploded view showing the inside surfaces of the two shell walls of the thermal induction unit in FIG. 8.

Turning now in more detail to the drawings, in which like numbers represent like parts throughout the several views, FIG. 1 shows one embodiment of the thermal induction unit according to this invention. In this embodiment of FIG. 1, the thermal induction unit 10 comprises of a series of parallel vanes 11 having front edge 9 and back edge 15 attached at their front edges 9 to a mounting rack 12 and a second series of vanes 13 having front edge 9 and back edge 15 attached at their back edges 15 to a second mounting rack 14. The two groups of vanes 11, 13 are mounted opposite one another in alternating sequence and in this embodiment are symmetric about an axis of symmetry 16 running equidistant between each two adjacent vanes. The vanes are shown in FIG. 1 with the back edges 15 of adjacent vanes 11, 13 abutting and the front edges 9 of adjacent vanes 11, 13 being apart and defining a gap 22. This positioning may be reversed as explained later. The interior of all vanes 11, 13 is composed of insulation material 17 of high thermal resistance. All vanes 11, 13 have lower side surfaces 18 and an upper side surface 19 and all side surfaces 18, 19 are of reflective material. The reflective side surfaces 18, 19 of the vanes shown in FIGS. 1 and 2 are of a parabolic shape. As FIG. 2 shows, each two adjacent parabolic sides 18—18, 19—19 which face each other have focus points 20 located on a common lattus rectum 21. In positioning the vanes for maximum efficiency of the invention, the gap 22 between alternating adjacent vanes should be as narrow as possible to maximize the ratio of insulated area B versus total area A. This is done by cutting off that part of the parabola (shown by dotted line 23 in FIG. 2) which extends below the lattus rectum and narrowing the gap 22 by moving the vanes 11, 13 closer together until the two focus points 20 become a common focus point located on the axis of symmetry 16 between the two adjacent vanes 11, 13 or by moving the vanes even closer together to further reduce the size of the gap.

The vane arrangement determines the direction in which heat will be induced to flow. As the vanes 11, 13 are shown in FIG. 1, with the gap 22 at the front, the induction mode is defined by the lower side surfaces 18 which focus heat rays I through the gap 22 between the adjacent vanes 11, 13 and out the front side of the thermal induction unit 10. The upper side surfaces 19, as arranged in FIG. 1, create a reflection mode by which rays R entering the unit 10 from the front side are reflected back. Only those rays approaching the area of the gap 22 are able to pass to the back side of the unit 10.

The two different series of vanes 13, 11 which are each mounted on separate racks 14, 12 can, if so desired be moved relative to one another by moving the racks 12, 14 parallel to one another. In this way, the vanes can be moved from a position in which the back edges 15 of the vanes 11, 13 abut to a posiion where the front edges 9 of the vanes 11, 13 abut one another. This results in closing the gap 22 at the front of the vanes and opening a gap 22 at the back of the vanes and changes the function of each adjacent vane such that the flow of heat is no longer from the back to the front as shown in FIG. 1 but rather from front to the back. The induction mode and reflection mode shown in FIG. 1 would be reversed.

FIG. 3 shows an embodiment of the invention similar to that shown in FIG. 1 except that the vanes 11, 3 of the embodiment in FIG. 3 have straight planar sides 18, 19 rather than parabolic sides 18, 19. The straight planar side has the disadvantage that there is no common focus point for the surface so that heat rays are not so easily directed into the gap 22 by the straight sides as they would be by the parabolic sides. FIG. 3 also shows an alternate method for changing the functional mode of each two adjacent vanes. The mode is changed in FIG. 3 by the use of gap stoppers 26 which are movable to either cover the gap 22 at the back of the vanes or to cover the gap 22 at the front of the vanes. As the gap stoppers 26 are positioned in FIG. 3, the induction mode is from front to back while the reflection mode is at the back.

FIG. 4 shows how the stacking of two or more thermal induction units 10 can aid in the even greater reduction of heat loss through the gaps 22. This is done by staggering the two thermal induction units 10 so that the reflective mode C of one unit is in alignment with the inductive mode D of the other unit. This prevents reverse flow of radiated heat through the gaps 22 of the inductive mode D. As in the configuration of FIG. 1, the vanes in FIG. 4 can be changed so as to reverse the induction and reflection modes D, C. This is done by attaching like oriented movable vanes 11 to a common center rack 29 so that the vanes 11 can be moved in unison. In this way, as the modes in the one thermal induction unit 10 are reversed, the modes in the other induction unit 10 are simultaneously reversed.

Another embodiment of a thermal induction unit which controls the transfer of radiant heat between two regions of differing temperature is shown in FIGS. 5 and 6. In FIG. 5 the vanes are illustrated as being spaced farther apart than they would be in a functional embodiment of the invention for purposes of explanation. FIG. 5 shows a top view of the unit with a series of approximately triangular shaped vanes 32 spaced equidistant from one another within a shell casing 33. FIG. 6 shows a side view of the unit demonstrating that the vanes 32 are of considerable length. The interiors of all vanes 32 are composed of insulation material 34 of high thermal resistance. For example, fiberglass filler, expanded polystyrene, and various other heat insulation materials can be used as the interior material. The vanes 32 have three reflective surfaces 36, 37, 38, two of which 36, 37, in this example of the thermal induction unit, have a parabolic edge profile. The vanes are illustrated as being spaced apart from each other so that the focus point 20 of each two sides which face one another 36, 37, as seen in FIG. 5, are spaced apart; however, for better thermal efficiency, the focus points 20 would coincide or overlap and the ratio of the width of a vane to the size of the gaps between the vanes preferably should be greater than 3:1. A portion of each parabola (dotted line 23) is cut off below the lattus rectum 21.

The vanes 40 are aligned so that the center of gravity 39 of their triangular edge portions 40 as seen in FIG. 5 are positioned along a straight line. Each vane 32 is pivotable about an axis 41 (see FIG. 6) running through the length of the vane 32 through the center of gravity 39 of its triangular profile. By rotating each vane 180°, the functional effect can be reversed by reversing the positions of the induction and reflection modes. The two parabolic shaped reflective sides 36, 37 and the gap 22 between vanes define the induction mode; whereas the third approximately arc shaped surface 38 acts as the reflection mode.

As seen in FIG. 7, the thermal induction unit 10 of FIGS. 5 and 6 can be doubled up to increase the efficiency of thermal induction and to aid in the reduction of heat loss. This is accomplished by staggering the units so that the reflection mode, surface 38, is in alignment with the gap 22 of the induction mode, whereby any heat rays R penetrating in reverse through the uninsulated gap 22 are reflected back into the induction mode by reflective surface 38. The ratio of the width of a vane to the gap between adjacent vanes should be greater than 3:1 and the space between the rows of vanes is unlimited.

Figure 10:
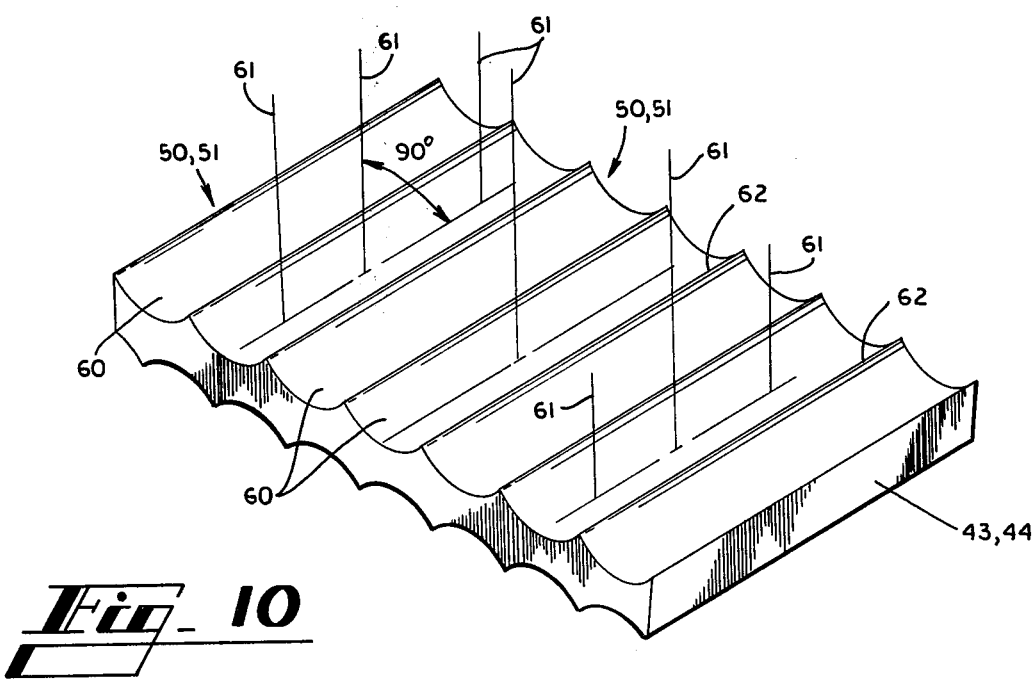
FIG. 10 is a perspective view of an alternate embodiment of the inside surface of one shell wall of the thermal induction unit of FIG. 8.

FIG. 8 shows a third embodiment of the thermal induction unit 10. This unit has two shell walls 43 and 44 and a core 47 positioned therebetween. The shell walls are made of material having high absorption/high emission qualities. In accomplishing heat induction, one of the shell walls 43 absorbs heat rays I and then emits these rays in a prescribed pattern focusing the emitted rays I' through heat passage 46 formed through core 47 and into the opposite heat absorbing shell wall 44 which then emits the rays into a second environment. The core 47 is composed of insulation material having high thermal resistance. This core prevents movement of heat radiation between the two shells 43, 44 except through the heat passages 46. The heat passage 46 can be punched apertures or cut grooves or of any other configuration. It is advantageous that they be as small as possible so as to provide the core 47 with as much insulation area as possible. The shell walls 43, 44 each possess a back side surface 50, 51 facing the core 47 which is curved so as to aim or focus at a point or line 49 within the heat passage 46. FIG. 9 shows the inner surfaces 50, 51 of the two shell walls 43, 44 as possessing concave hemispherical curved elements 54 for focusing rays I' at a point. FIG. 10 shows the inner surfaces 50, 51 of the two shell walls as possessing concave semicylindrical curved elements 60 for focusing rays I' at a line. The hemispherical curved elements 54 have a single normal centerline 55. The semicylindrical curved elements 60 have a locus of normal centerlines 61. In the embodiment shown in FIG. 9, the inner surfaces 50, 51 of the opposing walls 43, 44 are positioned alternated (see FIG. 9) so that the cusp 53 between curved elements 54 of one wall 43 or 44 is located on the normal centerline 55 of the curved element 54 of the opposite wall 43 or 44. The passages 46 are positioned with normal centerlines 58 which coincide with the normal centerline 55 of one of the curved elements 54 of the two inner surfaces 50, 51 of the outer walls 43, 44.

In the embodiment of FIG. 10, the walls 43, 44 can be positioned in an offset relationship with respect to each other so that the ridges 62 between curved elements 60 of one wall 43 or 44 are located on the loci of normal centerlines 61 of the opposite wall 43 or 44. The passages 46 are positioned in alignment with the loci of normal centerlines 61 of the curved elements 60 of the inner surfaces 50, 51 of the outer walls 43, 44.

As described with respect to FIG. 1, the reflective side surfaces of all embodiments of the disclosed invention are fabricated of highly reflective material preferably of low heat conductive material such as glass with a silver coated back surface, and the interior of the vanes is fabricated from low heat transfer material such as fiberglass or expanded polystyrene.

While this invention has been described in detail with particular reference to preferred embodiments thereof it will be understood that variations and modifications can be effected within the spirit and scope of the invention as described hereinbefore and as defined in the appended claims.

I claim:

1. Apparatus for controlling the transfer of heat between adjacent regions of differing temperatures comprising:
    a series of approximately flat rectilinear stationary vanes arranged with their longitudinal dimensions parallel to one another and in a common plane, each stationary vane including two reflective side surfaces and front and back edge portions, first mounting means for maintaining said stationary vanes oriented with their lateral dimensions approximately in parallel relationship with respect to one another,
    a series of approximately flat rectilinear movable vanes arranged with their longitudinal dimensions parallel to one another and in a common plane, each movable vane including two reflective side surfaces and front and back edge portions, second mounting means for maintaining said movable vanes oriented with their lateral dimensions approximately in parallel relationship with respect to one another,
    said second mounting means comprising a common rack means whereby said movable vanes are movable in unison back and forth from a first position, in which the front edge portion of each movable vane abuts the front edge portion of a first adjacent stationary vane and a gap is defined between the back edge portion of each movable vane and the back edge portion of a second adjacent stationary vane to a second position in which the back edge portion of each movable vane abuts the back edge portion of said second adjacent stationary vane and a gap is defined between the front edge portion of each movable vane and the front edge portion of said first adjacent stationary vane.

2. Apparatus of claim 1 and wherein each said reflective side surface of each of said stationary vanes and of each of said movable vanes has a focal point, said focal point being a point within said gap between said edge portions of said adjacent stationary vanes and movable vanes.

3. Apparatus of claim 1 and wherein each of said movable vanes is a mirror image of each adjacent stationary vane, said stationary vanes and the adjacent movable vanes being symmetrical about an axis of symmetry extending through said gap between said edge portions of adjacent stationary vanes and movable vanes.

4. Apparatus of claim 1 and wherein said two reflective side surfaces of both said stationary vanes and said movable vanes are of approximately concave parabolic shape, whereby one reflective side surface of each vane has a parabolic shape inverse to the parabolic shaped surface of the other reflective side surface of the same vane.

5. Apparatus of claim 1 and wherein said vanes are positioned alternating stationary vane then movable vane.

6. Apparatus of claim 1 and wherein said stationary vanes and said movable vanes are filled with insulation material of high thermal resistance.

7. Apparatus for controlling the transfer of heat between adjacent regions of differing temperatures comprising:
- a series of approximately flat rectilinear vanes arranged in side-by-side relationship with their longitudinal dimensions parallel to one another and in a common plane, each including two reflective side surfaces and front and back edge portions,
- said vanes being oriented such that said front edge portions of said vanes lie in a common plane, and said back edge portions of said vanes lie in a common plane, adjacent ones of said vanes being unattached from one another defining heat passages between adjacent front edge portions and between adjacent back edge portions of adjacent ones of said vanes; and
- means for closing the passages between the front edge portions of pairs of adjacent vanes and opening the passages between the back edge portions of adjacent pairs of vanes or alternatively for closing the passages between the back edge portions of the adjacent pairs of vanes and opening the passages between the front edge portions of the pairs of vanes,
- whereby heat transfer is impaired in one direction while heat transfer is blocked in the other direction.

8. The apparatus of claim 7 and wherein said two reflective side surfaces of said vanes are of approximately concave parabolic shape, whereby one reflective side surface of each vane has a parabolic shape inverse to the parabolic shaped reflective side surface of the same vane.

9. Apparatus of claim 7 and wherein said vanes are filled with insulation material of high thermal resistance.

* * * * *